US008935657B2

(12) United States Patent
Nguyen et al.

(10) Patent No.: US 8,935,657 B2
(45) Date of Patent: Jan. 13, 2015

(54) MODEL-TO-MODEL TRANSFORMATION BY KIND

(75) Inventors: Duong B. Nguyen, Nepean (CA); Mahboob Ashraf, Orleans (CA); Kevin J. Cornell, Stittsville (CA)

(73) Assignee: International Business Machines Corporation, Armonk, NY (US)

(*) Notice: Subject to any disclaimer, the term of this patent is extended or adjusted under 35 U.S.C. 154(b) by 1759 days.

(21) Appl. No.: 11/009,674

(22) Filed: Dec. 10, 2004

(65) Prior Publication Data
US 2006/0130008 A1 Jun. 15, 2006

(51) Int. Cl.
*G06F 9/44* (2006.01)
*G06F 9/45* (2006.01)
*G05B 13/02* (2006.01)

(52) U.S. Cl.
CPC .................................... *G06F 8/20* (2013.01)
USPC ............................. 717/104; 703/22; 700/31

(58) Field of Classification Search
USPC .................................. 717/100–178; 707/101
See application file for complete search history.

(56) References Cited

U.S. PATENT DOCUMENTS

| | | | | |
|---|---|---|---|---|
| 5,911,074 | A * | 6/1999 | Leprince et al. | 717/100 |
| 6,615,220 | B1 * | 9/2003 | Austin et al. | 707/999.104 |
| 6,711,734 | B1 * | 3/2004 | Baisley | 717/104 |
| 6,996,800 | B2 * | 2/2006 | Lucassen et al. | 717/106 |
| 7,725,300 | B2 * | 5/2010 | Pinto et al. | 703/2 |
| 2003/0177481 | A1 * | 9/2003 | Amaru et al. | 717/148 |
| 2004/0083199 | A1 * | 4/2004 | Govindugari et al. | 707/1 |
| 2005/0216917 | A1 * | 9/2005 | Krishnaswamy et al. | 719/315 |
| 2006/0064667 | A1 * | 3/2006 | Freitas | 717/104 |
| 2007/0130180 | A1 * | 6/2007 | Rasmussen | 707/100 |

OTHER PUBLICATIONS

Ho, Wai Ming et al., "UMLAUT: an Extendible UML Transformation Framework", 14th IEEE International Conference on Automated Software Engineering (ASE'99) p. 275-79.*
Kurtev, I. and van den Berg, K. 2003. Model driven architecture based XML processing. In Proceedings of the 2003 ACM Symposium on Document Engineering (Grenoble, France, Nov. 20-22, 2003). DocEng '03. ACM, New York, NY, 246-248. DOI= http://doi.acm.org/10.1145/958220.958264.*
Rensink, Arend (Editor), "Model Driven Architecture: Foundations and Applications", CTIT Technical Report TR-CTIT-03-27, University of Twente, Jun. 27, 2003.*
The Value of Modeling; Nov. 15, 2004; pp. 1-6; An abstract of this article may be found at http://www-106.ibm.com/developerworks/rational/library/nov04/naiburg-cernosek/index.html.
Alan Brown; An Introduction to the IBM Rational Design & Construction Tool Strategy; Nov. 15, 2004; pp. 1-7.
Will MDD Fulfill Its Promises?; IEEE Computer Society, pp. 5-7.
Dan Matheson, et al; Managed Evolution of a Model Driven Development Approach to Software-Based Solutions; OOPSLA & GPCE Workshop 2004: Best Practices for Model Driven Software Development; pp. 1-19.

* cited by examiner

*Primary Examiner* — Ryan Coyer
(74) *Attorney, Agent, or Firm* — Steven M. Greenberg, Esq.; CRGO Law

(57) ABSTRACT

A method, system and apparatus for the model-to-model transformation by element-kind of a source model are proposed. An element-kind model-to-model transformation can include one or more transform elements defining a traversal of a source model, an element-kind mapping and the conversion from source models to target models. The element-kind mapping can include a set of associations between element-kinds for the source model and corresponding transformation rules to produce target objects in a target model.

15 Claims, 3 Drawing Sheets

MODEL-TO-MODEL TRANSFORMATION BY KIND

BACKGROUND OF THE INVENTION

1. Statement of the Technical Field

The present invention relates to field of software development and more particularly to the model driven development of a software application.

2. Description of the Related Art

Modern software systems have become increasingly pervasive and open-ended, and are expected to deliver critical computing services in a dependable manner across multiple, heterogeneous computing environments. To better manage the complexity of developing modern software systems, software development strategies can be employed which raise the level of abstraction at which software systems are conceived, implemented and evolved. Model-driven development (MDD) represents one such software development strategy in which models are the primary artifacts of software development.

Modeling complex applications has several general benefits which can include a better understanding of the business or engineering situation at hand, the construction and design of application architectures, and the creation of visualizations of code and other forms of implementation. In this regard, the essence of modeling is abstraction and any visualization of code is indeed an abstraction in that application information can be selectively exposed while details deemed unnecessary or unwanted can be suppressed. Nevertheless, the terms "code model", "implementation model" or "platform-specific model" (PSM) are often used to qualify such abstractions from a higher-level, platform independent model (PIM) that does not have such direct relationships to program code.

In conventional MDD, visual models can be created utilizing model constructs or model types. The visual models can be created from a methodological process that often begins with application requirements and culminates with a high-level architectural design model. Developers can create a detailed design model from which skeletal code can be generated to an integrated development environment. The integrated development environment, in turn, can be used to complete the detailed coding. Any changes to the code that affect the design model can be synchronized back into the model. Likewise, any model changes can be synchronized into the existing code.

Modern trends in MDD include software development tools and techniques that support the vision of the Object Management Group as framed by the "Model Driven Architecture" (MDA). The MDA advocates an approach in which models of software that abstract over technology-specific details are systematically transformed to deployable technology-specific implementations. In this regard, a transformation defines changes that are applied to a source model to produce a target model. While the models enjoy specific relationships between one another, the transformation steps are often a discontinuous jump forward rather than a specifiable mechanical transformation. The discontinuous jump is most noticeable in the early stages of design refinement and solution exploration where fundamental decisions are made by the software engineer in order to satisfy solution requirements.

Systematic support for model transformations is considered to be critical to the success of the MDA. Often referred to as a model-to-model transformation, the source and target models can be based upon a meta-model like the Unified Modeling Language (UML), including customer specific meta-models. At present, model-to-model transformations are manually driven and can require substantial expertise and development resources to perfect. Yet, as MDD matures, it will be desirable to automate the generation of a PSM from a PIM such that the transformation can fit the mold of a code generator.

Part of automating a model-to-model transformation can include the traversal of a source model hierarchy to apply transformation rules. Yet, some models can be highly complex and can include substantial number of elements and element-kinds. Consequently, defining transformation rules for the entire hierarchy of the source model can be so cumbersome as to defeat any efficiencies gained through the automation of the model-to-model transformation.

SUMMARY OF THE INVENTION

The present invention addresses the deficiencies of the art in respect to traversing and transforming a complex source model in a model-to-model transformation and provides a novel and non-obvious system, method and apparatus for the model-to-model transformation by element-kind of a source model. In this regard, an element-kind model-to-model transformation can include one or more transform elements defining a traversal of a source model and an element-kind mapping. The element-kind mapping can include a set of associations between element-kinds for the source model and corresponding transformation rules to produce target objects in a target model.

In one aspect of the invention, the transform elements can be contained in a transform. In this regard, the element-kind mapping can be disposed in the transform and the transform elements further can be context extractors. The transformation rules also can be encapsulated in other transforms. In another aspect of the invention, the transformation further can include at least one property referenced by the transformation. Finally, in yet another aspect of the invention, the transformation can include at least one condition referenced by at least one of the transform elements.

A method for performing element-kind model-to-model transformations can include traversing a source model hierarchy having one or more source objects and identifying an element-kind for each of the source objects. The identified element-kinds can be mapped to corresponding transformation rules. Subsequently, the corresponding transformation rules can be executed on the source objects to produce target objects in the target model.

The traversing step can include sequentially processing a list of transform elements in the transformation. The processing step, by comparison, can include loading content extractors among the transform elements and identifying other transform elements through the loaded content extractors in order to traverse the source model. The mapping step, in turn, can include mapping identified element-kinds for the source objects to corresponding transforms having transformation rules.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for transformation by element-kind in a model-to-model transformation. In accordance with the present invention, a mapping of element-kinds to transformation rules can be established in association with a model-to-model transformation. Each element-kind can be a model construct specific to the model, for instance UML. The mapping can pre-specify the transformation logic to be applied when encountering a corresponding element-kind in the source model hierarchy. In this way, even the most complex model hierarchies can be traversed and transformed efficiently without requiring a complex set of transform elements ordered to properly traverse the source model hierarchy.

Figure 1:
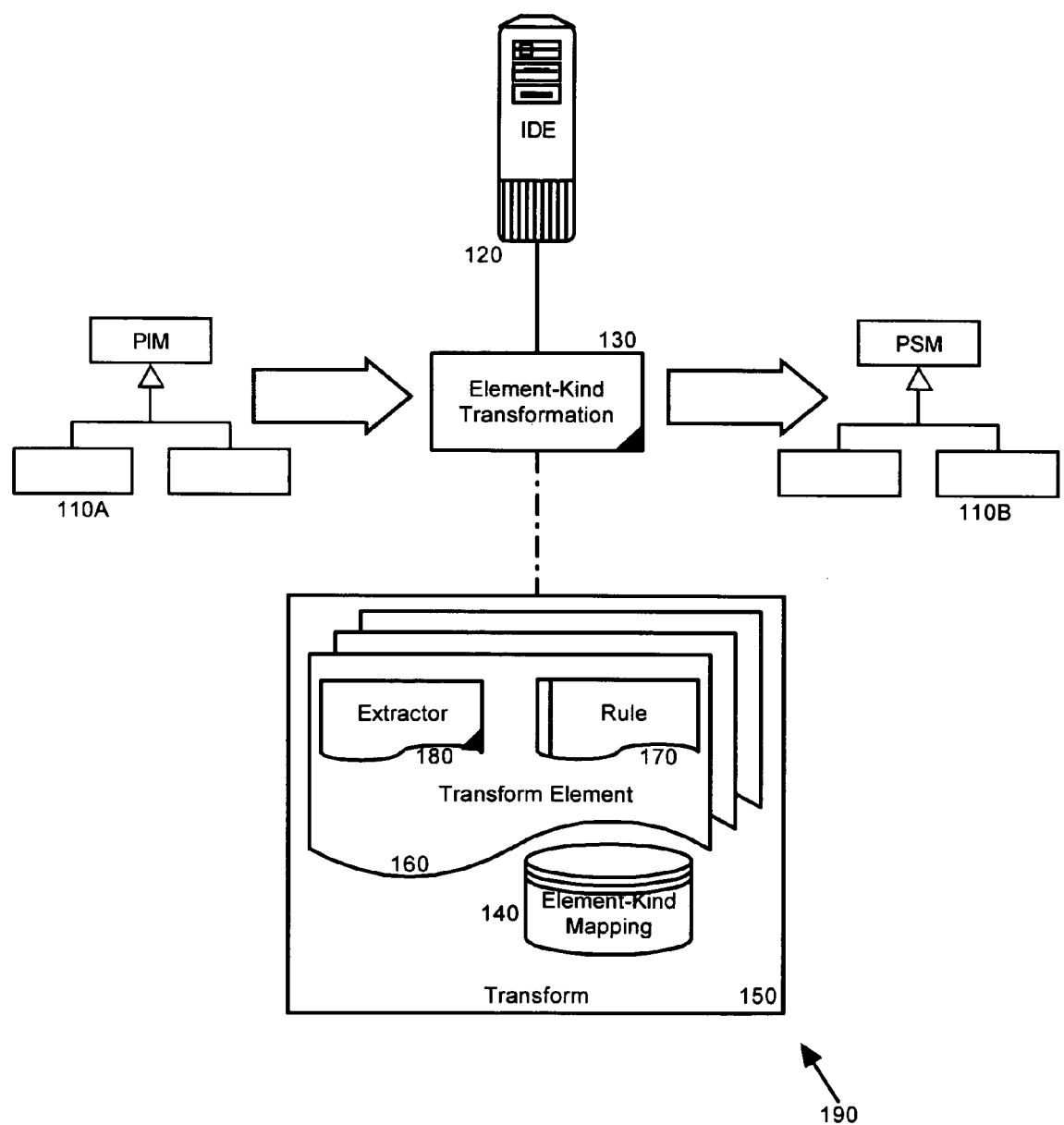
FIG. 1 is a schematic illustration of a model-to-model transformation system configured for transformation by element-kind.

In further illustration, FIG. 1 is a schematic illustration of a model-to-model transformation system configured for transformation by element-kind. The system can include a development environment 120 coupled to element-kind transformation logic 130. The element-kind transformation logic 130 can process a transformation 190 specifying the production of a target model 110B from a source model 110A. In particular, the element-kind transformation logic 130 can traverse the source model 110A according to the transformation 190 during which traversal the element-kind transformation logic 130 can identify element-kinds in the source model 11A. For each identified element-kind in the source model 110A, the element-kind transformation logic 130 can execute a corresponding transformation rule or rules to produce a portion of the target model 110B.

The transformation 190 can include a transform 150 which can act as a container to a sequence of transform elements 160. Each transform element 160 can be a transformation rule 170, or a content extractor 180. Moreover, a transform element 160 can also refer to another transform 150, also known as a "sub-transform". Importantly, the transform 150 can include an element-kind mapping 140. The element-kind mapping 140 can include a listing of element-kinds and corresponding transform elements 160 having particular transformation rules 170.

In operation, the transform 150 can execute each source object in the source model 110A by sequentially executing all of its contained transform elements 160 with the source objects of the source model 110A. Specifically, a content extractor 180 in each of the transform elements 160 can execute a source object in the source model 110A by extracting the desired content of that source object. The source object can be processed to identify an element-kind for the source object and the element-kind for the source object can be compared to the element-kinds in the element-kind mapping 140. When a match is found for the source object, the corresponding transformation rule or rules 170 can be applied to transform the source object into an object in the target model 110B.

Figure 2:
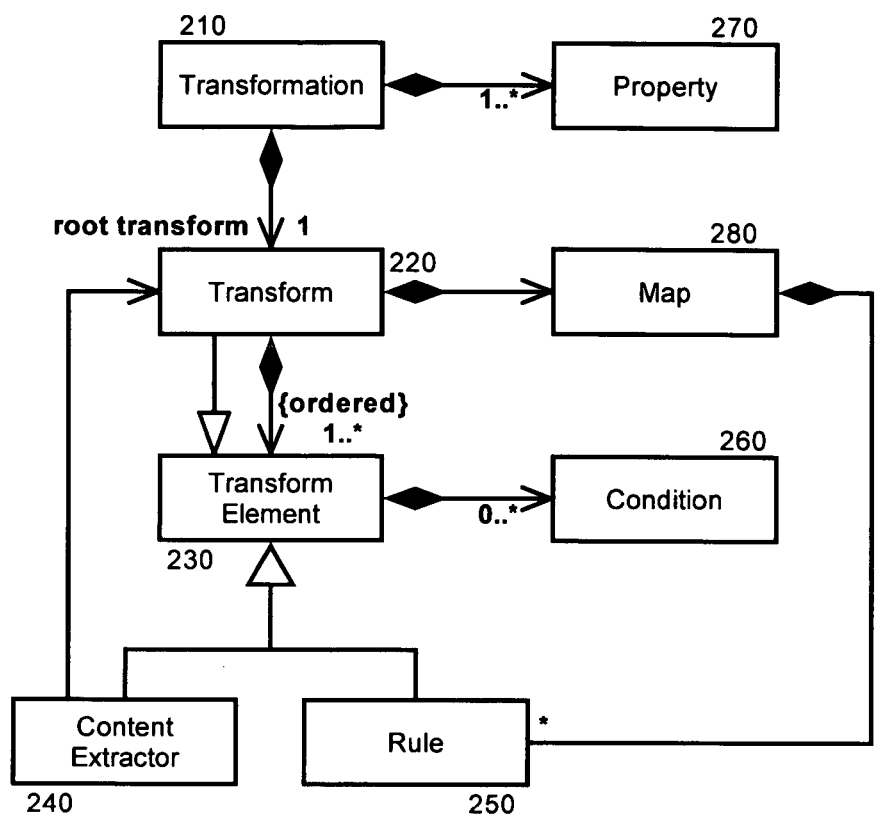
FIG. 2 is an object model of a model-to-model transformation configured for transformation by element-kind; and, FIG. 3 is a pictorial illustration of a process for transformation by element-kind in a model-to-model transformation.

To further illustrate the structure and function of the element-kind transformation logic 130 of the present invention, FIG. 2 is an object model of a model-to-model transformation configured for element-kind traversal. As shown in FIG. 2, an element-kind transformation 210 can include a reference to a transform 220. The transform 220 can include a reference to one or more transform elements 230. Each transform element 230 can be a content extractor 240 or a rule 250. Finally, where the transform element 230 is a content extractor 240, the content extractor 240 can refer to a transform 220. Importantly, the transform 220 can include a reference to an element-kind mapping 280. The element-kind mapping 280 can include a set of pre-specified element-kinds for the source model. In this regard, each of the element-kinds can be mapped to one or more transform elements 230—namely rules 250.

A transformation 210 can include a single root transform 220 and many associated properties 270. Properties 270 can include name/value pairs that define data for the transformation 210 when the transformation 210 executes. The root transform 220 can include rules 250 for performing initial and final processing and content extractors 240 for processing the given source model object or objects. The connections between the transforms 220 and content extractors 240 can determine how the source model is to be traversed. In some cases, the transform 220 can include direct references to content extractors 240 and indirect references to other transforms 220 through the content extractors 240. The indirect references to other transforms 220, in turn, enable the traversal of the source model.

The transformation 210 can be executed within a given context, which can provide access to one or more associated properties 270. The context can include a reference to one of the properties 270 for the current source object in process and another one of the properties 270 for the current target container object. The current source and target container ones of the properties 270 in the context can change as the source model is traversed and as the target model is generated. Optionally, though, before any transform element 230 can execute, first the transform element 230 must accept the current context. In that circumstance, if a transform element does not accept the current context, it is not executed.

The acceptance can be conditionally performed based upon a condition 260. For example, a rule designed to process an operation can have a condition that returns true if the source object is an operation thereby permitting the execution of the rule on that operation, and false otherwise, thereby blocking the execution of the rule. The conditional execution of a source object in a source model to produce a target object in the target model can be valuable to those seeking to automate the process of generating one or more detailed models from an abstract model. For example, by applying several transformations on models at various levels of abstraction, system architects can more easily generate all aspects of a business system including the front end interface, and the back end database control.

In operation, when a transformation 210 is executed, the root transform 220 is executed which results in the execution of any contained content extractors 240. When executing a content extractor 240, the content extractor 240 returns a list of related source objects to be processed. The element-kind of each of the related source objects can be identified and processed in reference to the element-kind mapping 280 to identify transformation rules 250 to be applied to the source object to produce one or more objects for the target model. Additionally, one or more extractors 240 can be defined to perform the processing for the next level of objects in the source model.

Figure 3:
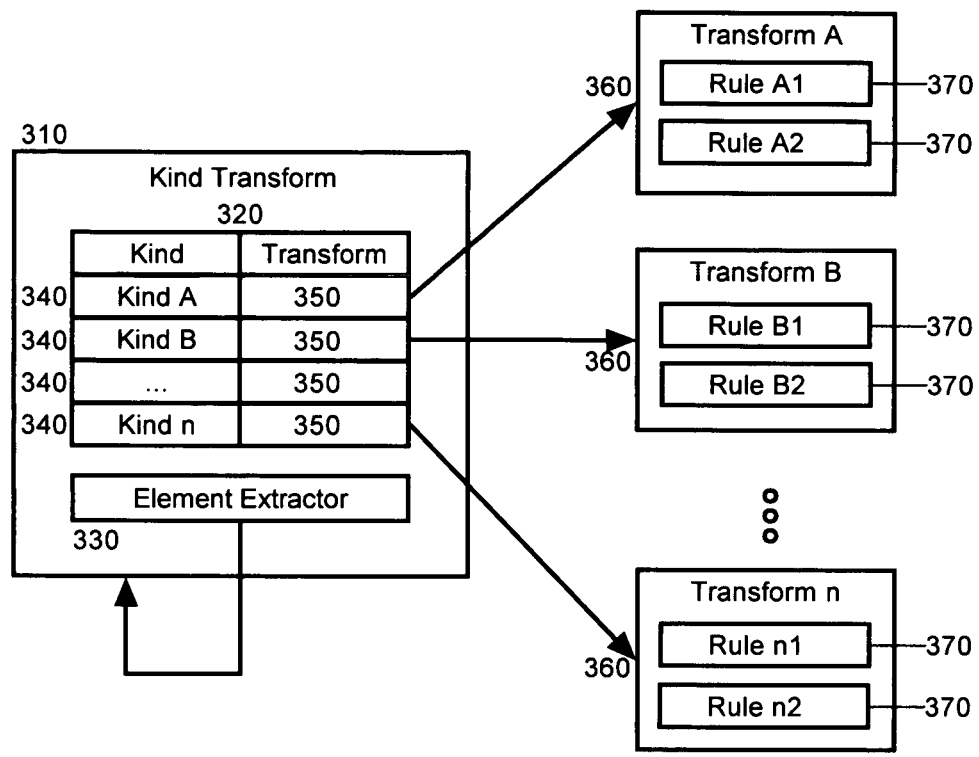

In more specific illustration, FIG. 3 is a pictorial illustration of a process for transformation by element-kind in a model-to-model transformation. The process can involve an element-kind transform 310 having both an element-kind mapping 320 and an element extractor 330. The element extractor 330 can extract the related objects of a source object in a source model and recursively traverse each of the related objects across the hierarchy of the source model. The element-kind mapping 320, in turn, can include a set of associations of element-kinds 340 to corresponding transform elements 350. Each entry in the element-kind mapping 320 can specify a transform element 360 with corresponding transformation rules 370 to be applied when encountering an associated element-kind 340 in an extracted object.

Thus, the content extractors and sub-transforms can be kept in a single ordered list within each transform, which can determine how the source model is to be traversed. Moreover, as the source model is traversed, the element-kind of an object in the source model can be compared to the element-kind mapping. When a match occurs, the corresponding rule or rules can be executed on the object. As a result, the transformation of the source model can be a declarative process where the transformation rules and traversal order can be specified for the objects in the source model.

The present invention can be realized in hardware, software, or a combination of hardware and software. An implementation of the method and system of the present invention can be realized in a centralized fashion in one computer system or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for performing element-kind model-to-model transformations, the method comprising the steps of:
    traversing a source model hierarchy of a source model having a plurality of source objects according to a single ordered list within a element-kind transform that specifies a traversal order of the plurality of source objects;
    identifying an element-kind for each of said source objects in the source model hierarchy, each element-kind comprising a model construct specific to the source model hierarchy;
    mapping identified element-kinds for said source objects to corresponding transformation rules defined in a table, the mapping pre-specifying transformation logic to be applied when encountering a corresponding element-kind in the source model hierarchy; and,
    executing said corresponding transformation rules on said source objects to produce target objects in a target model.

2. The method of claim 1, wherein said traversing step comprises the step of sequentially processing a list of transform elements.

3. The method of claim 2, wherein said processing step comprises the steps of:
    loading content extractors among said transform elements; and,
    identifying other transform elements through said loaded content extractors in order to traverse said source model.

4. The method of claim 1, wherein said mapping step comprises the step of mapping identified element-kinds for said source objects to corresponding transforms comprising transformation rules.

5. An element-kind model-to-model transformation system comprising:
    a plurality of transform elements defining a traversal of a source model;
    an element-kind mapping comprising a set of associations between element-kinds for said source model and corresponding transformation rules to produce target objects in a target model; and,
    element-kind transformation logic executing in memory of a computer, the element-kind transformation logic comprising program code enabled to traverse a source model hierarchy of the source model having a plurality of source objects according to a single ordered list within a element-kind transform that specifies a traversal order of the plurality of source objects, to identify an element-kind for each of said source objects in the source model hierarchy, each element-kind comprising a model construct specific to the source model hierarchy, to map identified element-kinds for said source objects to corresponding transformation rules defined in a table, the mapping pre-specifying transformation logic to be applied when encountering a corresponding element-kind in the source model hierarchy, and to execute executing said corresponding transformation rules on said source objects to produce target objects in said target model.

6. The element-kind model-to-model transformation system of claim 5, wherein said transform elements are contained in a transform.

7. The element-kind model-to-model transformation system of claim 5, wherein said transform elements are content extractors.

8. The element-kind model-to-model transformation system of claim 5, wherein said transformation rules are encapsulated in other transforms.

9. The element-kind model-to-model transformation system of claim 6, wherein said element-kind mapping is disposed in said transform.

10. The element-kind model-to-model transformation system of claim 5, further comprising at least one property referenced by the transformation.

11. The element-kind model-to-model transformation system of claim 5, further comprising at least one condition referenced by at least one of said transform elements.

12. A non-transitory machine readable storage device having stored thereon a computer program for performing element-kind model-to-model transformations, the computer program comprising a routine set of instructions which when executed by a machine causes the machine to perform the steps of:

traversing a source model hierarchy of the source model having a plurality of source objects according to a to a single ordered list within a element-kind transform that specifies a traversal order of the plurality of source objects;

identifying an element-kind for each of said source objects in the source model hierarchy, each element-kind comprising a model construct specific to the source model hierarchy;

mapping identified element-kinds for said source objects to corresponding transformation rules defined in a table, the mapping pre-specifying transformation logic to be applied when encountering a corresponding element-kind in the source model hierarchy; and, executing said corresponding transformation rules on said source objects to produce target objects in a target model.

13. The non-transitory machine readable storage device of claim 12, wherein said traversing step comprises the step of sequentially processing a list of transform elements.

14. The non-transitory machine readable storage device of claim 12, wherein said sequentially processing step comprises the steps of:

loading content extractors among said transform elements; and, identifying other transform elements through said loaded content extractors in order to traverse said source model.

15. The non-transitory machine readable storage device of claim 12, wherein said mapping step comprises the step of mapping identified element-kinds for said source objects to corresponding transforms comprising transformation rules.

* * * * *